United States Patent
Yoshinaga et al.

[11] Patent Number: 6,084,613
[45] Date of Patent: Jul. 4, 2000

[54] APPARATUS FOR ELECTROSTATICALLY FORMING A DEVELOPER IMAGE ON A CONVEYED RECORDING MEDIUM INCLUDING AN ARRAY OF CONTROL ELECTRODES EACH HAVING AN OPTIMIZED PITCH

[75] Inventors: Hajime Yoshinaga, Ikoma-gun; Teruki Sugiura, Yamatokoriyama; Yoshitaka Matsumoto, Shijonawate, all of Japan

[73] Assignee: Sharp Kabushiki Kaisha, Osaka, Japan

[21] Appl. No.: 09/034,388

[22] Filed: Mar. 4, 1998

[30] Foreign Application Priority Data

Mar. 18, 1997 [JP] Japan .................................. 9-064989

[51] Int. Cl.$^7$ .................................................. G03F 15/00
[52] U.S. Cl. ............................................. 347/55; 347/10
[58] Field of Search ................................. 347/55, 10, 11, 347/123, 128

[56] References Cited

U.S. PATENT DOCUMENTS 4,860,036  8/1989  Schmidlin ................................. 347/55

FOREIGN PATENT DOCUMENTS 7-25057  1/1995  Japan .

*Primary Examiner*—Joan Pendegrass
*Attorney, Agent, or Firm*—David G. Conlin; David A. Tucker

[57] ABSTRACT

The array pitch 'd' between the control electrode strips with respect to the conveyed direction of the recording medium is determined based on the order of applying operating voltage, the resolution 'x' of the image with respect to the conveyed direction, and the number 'm' of the control electrode strips. Illustratively, in order to obtain a particular resolution 'x' with respect to the conveyed direction of the paper, by taking into consideration the reduction in dot interval or conveyed distance by the conveyance of the recording paper, the array pitch 'd' between the control electrode strips with respect to the conveyed direction of the recording medium is set as the dot distance produced when the paper is not moved, plus the above reduction. This can be written as $d=(n+1/m)/x$ where n is a natural number.

2 Claims, 4 Drawing Sheets

APPARATUS FOR ELECTROSTATICALLY FORMING A DEVELOPER IMAGE ON A CONVEYED RECORDING MEDIUM INCLUDING AN ARRAY OF CONTROL ELECTRODES EACH HAVING AN OPTIMIZED PITCH

BACKGROUND OF THE INVENTION

(1) Field of the Invention

The present invention relates to an image forming apparatus such as a digital copier, facsimile machine, digital printer, plotter etc., and more particularly relates to an image forming apparatus in which an image is formed on a recording medium by causing the developer to jump thereto.

(2) Description of the Prior Art

There have been known image forming apparatuses which, in accordance with an image signal, form a visual image on a recording medium such as paper etc. Japanese Patent Application Laid-Open Hei 7 No. 25,057, for example, discloses an image forming apparatus wherein a toner image is formed, in accordance with an image signal, on a recording medium by causing the toner as the developer to jump whilst the voltage being applied to a control electrode which is placed in the jumping path of the toner is varied.

More specifically, the control electrode of this apparatus, has a number of gates to be the passage holes for the toner, which are arranged grid-wise, i.e., at regular intervals in the conveyed direction of the recording paper, creating a predetermined resolution, arranged in a 4 gate unit slant-wise in the direction perpendicular to the conveyed direction, forming a coarse pitch. In this arrangement, the potential of the gates is controlled in a regular cycle in a time-divisional manner in accordance with the image signal, so as to control toner transfer, to form a toner image on the recording paper.

However, in accordance with the above conventional apparatus, when the potential of the gates is controlled in a time-divisional manner with respect to the perpendicular direction to the conveyed direction of the paper (to be referred to hereinbelow as the row-direction) in order to attain the predetermined resolution with respect to the conveyed direction of the paper, it is necessary to take into consideration the relationship between the pitch between the gates with respect to the conveyed direction of the paper and the conveying speed of the paper to be recorded, and this has complicated the driver control of the gates.

Besides, if the relationship between the pitch of the gates with respect to the conveyed direction of the recording paper and the conveying speed of the paper is not correct, the control signal becomes inactive, as shown in FIG. 1, from the time when the time-divisional switching control of control electrodes S1–S4 for one line has been completed based on the line synchronizing signal to the time when the next time-divisional switching control starts, thus resulting in reduction of the effective time available for printing.

SUMMARY OF THE INVENTION

The present invention has been devised in view of the above problems, and it is therefore an object of the present invention to provide an image forming apparatus which, though still has a simple structure, can perform a high speed image forming operation without having any inactive time between successive lines being printed.

In order to attain the above object, the present invention is configured as follows:

In accordance with the first aspect of the invention, an image forming apparatus wherein an image is formed on a recording medium with the developer by performing voltage application in a time-divisional manner, to a plurality of control electrode strips having passage holes that allow the charged developer particles to pass therethrough, is characterized in that the array pitch of the control electrode strips with respect to the conveyed direction of the recording medium is determined based on the order of performing voltage application, the resolution of the image with respect to the conveyed direction and the number of the control electrode strips.

In accordance with the second aspect of the invention, an image forming apparatus wherein an image is formed on a recording medium with the developer by performing voltage application in a time-divisional manner, to a plurality of control electrode strips having passage holes that allow the charged developer particles to pass therethrough, is characterized in that when voltage application is performed in the same direction as the arranged order of the control electrode strips with respect to the conveyed direction of the recording medium, the array pitch 'd' of the control electrode strips with respect to the conveyed direction of the recording medium is set so as to satisfy the following relation:

$$d = (n + 1/m)/x$$

(where n is a natural number)
where x is the resolution of the image and m is the number of the control electrode strips.

In accordance with the third aspect of the invention, an image forming apparatus wherein an image is formed on a recording medium with the developer by performing voltage application in a time-divisional manner, to a plurality of control electrode strips having passage holes that allow the charged developer particles to pass therethrough, is characterized in that when voltage application is performed in the reverse direction to the arranged order of the control electrode strips with respect to the conveyed direction of the recording medium, the array pitch 'd' of the control electrode strips with respect to the conveyed direction of the recording medium is set so as to satisfy the following relation:

$$d = (n - 1/m)/x$$

(where n is a natural number)
where x is the resolution of the image and m is the number of the control electrode strips.

Next, operation of the present invention is described hereinbelow.

In accordance with the image forming apparatus of the first feature of the invention, the conveyed distance of the paper while one control electrode strip is activated, is determined based on the resolution and the number of the control electrode strips. Here, the distance between the image dots formed by neighboring control electrode strips is reduced by the above conveyed distance compared to the dot distance (i.e. the distance between the neighboring gates arranged in the conveyed direction) formed when the paper is not moved. Taking into consideration this fact, the array pitch of the gates in the control electrode strips with respect to the conveyed direction of the recording medium is based on the order or direction of voltage application, the resolution of the image in the conveyed direction of the paper (the dot density in the image) and the number of the control electrode strips.

In accordance with the image forming apparatus of the second feature of the invention, the conveyed distance 'z' of the paper while one control electrode strip is activated, is determined as the reciprocal of the product of the resolution 'x' and the number of control electrode strips 'm', i.e., (=1/(mx)). Here, in the case where voltage is applied to the control electrode strips in the same order as the arranged order of the control electrode strips with respect to the conveyed direction of the paper, the distance between the image dots formed by neighboring control electrode strips is reduced by the above conveyed distance 'z' compared to the dot distance 'y' (=n/x) formed when the paper is not moved. Accordingly, in order to obtain a particular resolution 'x' with respect to the conveyed direction of the paper, the array pitch 'd' between control electrode strips with respect to the conveyed direction of the recording medium should and may be set as the distance 'y' plus the conveyed distance 'z', by taking into consideration the reduction of the conveyed distance 'z'. This can be written as $d=(n+1/m)/x$ where n is a natural number.

In accordance with the image forming apparatus of the third feature of the invention, the conveyed distance 'z' of the paper while one control electrode strip is activated, is determined as the reciprocal of the product of the resolution 'x' and the number of control electrode strips 'm', i.e., (=1/(mx)). Here, in the case where voltage application is performed in the reverse order to that of the arrangement of the control electrode strips with respect to the conveyed direction of the paper, the distance between the image dots formed by neighboring control electrode strips is increased by the above conveyed distance 'z' compared to the dot distance 'y' (=n/x) formed when the paper is not moved. Accordingly, in order to obtain a particular resolution 'x' with respect to the conveyed direction of the paper, the array pitch 'd' between control electrode strips with respect to the conveyed direction of the recording medium should and may be set as the distance 'y' minus the conveyed distance 'z', by taking into consideration the reduction of the conveyed distance 'z'. This can be written as $d=(n-1/m)/x$ where n is a natural number.

DESCRIPTION OF THE PREFERRED EMBODIMENTS

Figure 1:
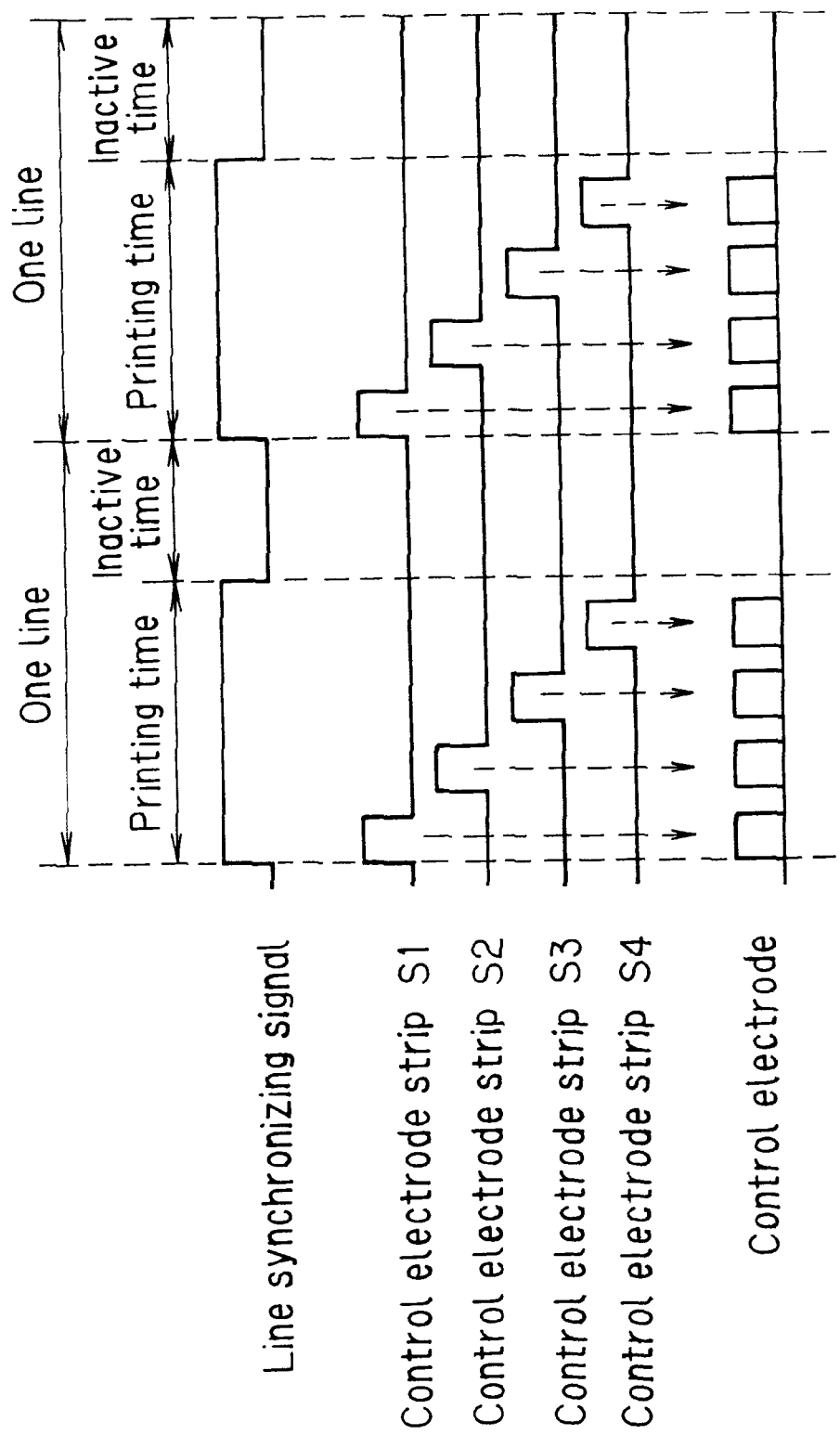
FIG. 1 is a diagram for explaining the operation of a conventional image forming apparatus.

The embodiment of the invention will hereinafter be described with reference to FIGS. 2 through 4. In these figures, common elements or corresponding elements will be allotted with the same reference numerals, so that the description of such elements will not be repeated. In the following embodiment, description will be made of an example where an image forming apparatus for the embodiment has a configuration for negatively charged toner.

Figure 2:
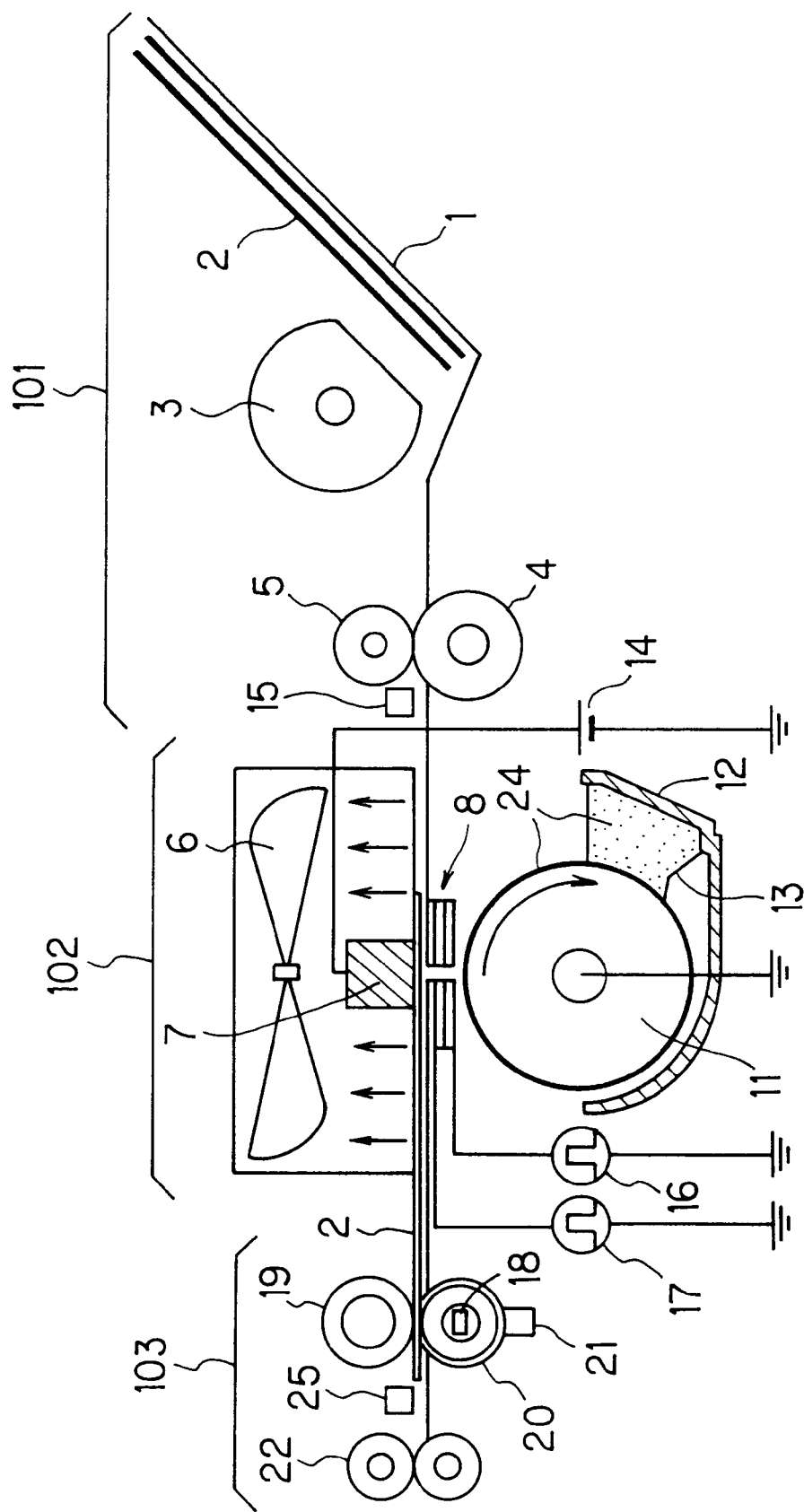
FIG. 2 is a diagram illustrating the configuration of an image forming apparatus in accordance with the embodiment of the invention.

An image forming apparatus in accordance with this embodiment is composed of, in view of functions, a paper feeding unit 101, printing unit 102 and fixing unit 103, as shown in FIG. 2. Hereinbelow, each part will be described illustratively.

First, paper feeding unit 101 is arranged on the input side of printing unit 102 which is located at the approximately center of the apparatus. This paper feeding unit 101 is composed of a paper tray 1 for storing paper 2 as the recording medium, a pickup roller 3, a paper feed roller 4 and a paper guide roller 5 and a paper feed sensor 15.

Here, pickup roller 3 is rotationally driven by an unillustrated driver means, to thereby pick up only a single sheet of recording paper 2 from paper tray 1 and deliver it to paper feed roller 4. The thus fed paper 2 is further conveyed to printing unit 102 (to be described hereinbelow) by means of paper feed roller 4 arranged below the guide of paper guide roller 5. Paper feed sensor 15 detects the conveyance state of recording paper 2.

Fixing unit 103 disposed on the output side of printing unit 102, is composed of a heat roller 20, a heater 18, a pressing roller 19, a temperature sensor 21, a paper discharge sensor 25 and a paper discharge roller 22. Here, heat roller 20 and pressing roller 19 are rotationally driven by an unillustrated driver, whereby the toner image formed on paper 2 at the aftermentioned printing unit 102 is heated and pressed so as to be fixed thereon.

In the above fixing unit, heat roller 20 is made up of an aluminum pipe of 2 mm thick, for example. Heater 18 is of a halogen lamp for instance, and incorporated in heat roller 20. Pressing roller 19 is made of silicone for example, and is provided opposite heat roller 20.

Heat roller 20 and pressing roller 19 which are arranged opposite to each other, are pressed against one another, holding paper 2 in between and pressing it, with a pressing load, e.g. 2 kg, from unillustrated springs etc., provided at both ends of their shafts. Paper 2 with a toner image formed thereon is pressed between, whilst being heated by, heat roller 20 and pressing roller 19, so that the toner image will be fixed to paper 2.

Temperature sensor 21 measures the surface temperature of heat roller 20. The measurement result is controlled by an unillustrated controller so as to govern the on/off operation of heater 18, thus maintaining the surface temperature of heater roller 20 at a fixed temperature, e.g., 150° C. Paper discharge sensor 25 detects the passage of recording paper 2 between pressing roller 19 and heat roller 20.

It should be noted that the materials of heat roller 20, heater 18, pressing roller 19, etc., as well as the surface temperature of heat roller 20 and the like, are not specifically limited to the above references. Further, fixing unit 103 may have a fixing configuration in which the toner image is either only heated or pressed to affix itself to recording paper 2.

Next, detailed description will be made of printing unit 102, which directly form a toner image on the paper by causing the toner as the developer to jump by electric force whilst controlling the jumping passage of the toner in accordance with the image signal.

Illustratively, printing unit 102 has, on the underside of the conveying passage of paper 2, a toner storage tank 12 for storing toner 24 as the developer, a drum-shaped toner support (sleeve) 11 for supporting toner 24 on its outer peripheral surface and a doctor blade 13 which negatively electrifies toner 24 and regulates the thickness of the toner layer carried on the peripheral surface of toner support 11.

Toner support 11 is electrically grounded and is configured so that it can carry toner 24 in the form of a layer on its peripheral surface. The toner support is driven by an unillustrated driver means in a direction indicated by arrow A in the figure, with its surface speed set at 100 mm/sec, for example. Doctor blade 13 is arranged on the upstream side with respect to the rotational direction of toner support 11, spaced at a distance of 60 μm, for example, from the outer peripheral surface of toner support 11. The thickness of the toner layer is regulated by this gap.

Toner 24 is of a non-magnetic type having a mean particle diameter of, for example, 6 μm and is tribo-electrified with static charge of −5 to −10 (μC/g) by doctor blade 13. Here, the distance between doctor blade 13 and toner support 11 as well as the mean particle size, the amount of static charge, etc., of toner 24 are not particularly limited to the above-mentioned values.

Provided on the upper side of the conveying path of paper 2 is a paper suction fan 6 which is housed by a cover (not designated by a reference numeral) that opens toward paper 2. A rearside electrode 7 is provided inside the cover so that it can come in contact with paper 2, facing the peripheral surface of toner support 11.

Arranged on the lower side of recording paper 2 is a control electrode unit 8 located between toner support 11 and rearside electrode 7. This control electrode unit 8 is provided with gates which, as will be detailed, control toner transfer, that is, function so as to allow or disallow the passage of the toner jumping from toner support 11 to rearside electrode 7.

Rearside electrode 7 has a fixed potential of e.g., 2 kV, supplied by a rearside electrode driver power source 14, thus generating an electric field for causing toner 24 to jump from toner support 11. Paper suction fan 6 exhausts air from the cover interior so as to generates a negative pressure, thus attracting recording paper 2 to rearside electrode 7. Control electrode unit 8, as shown in FIG. 3, has a insulative board (not shown), a plurality of row-control electrode strips 8R (8R-1 to 8R-8) arranged in parallel to one another having a pitch of d, on one side of the insulative board, perpendicularly to conveyed direction B of paper 2. The control electrode further has column-control electrode strips 8C (8C-1 to 8C-640) arranged on the opposite side of the insulative board at intervals of a predetermined pitch, in such a manner that they cross over row-control electrode strips 8R.

Formed at each of the intersections between these row-control electrodes strips 8R and column-control electrode strips 8C is a hole 23 forming the passage of the toner (to be referred to hereinbelow as 'gate'). Control electrode unit 8 used here is composed of gates arranged in a rectangular array of 8 rows and 640 columns. The arrangement of gates should not be limited to this, the numbers of gates in the directions of the rows and columns may be of any number.

Here, each column-control electrode strip 8C is arranged at a predetermined angle with row-control electrode strips 8R so that the gates on the same column-control electrode strip 8C are positioned at intervals of a pitch 'a' with respect to the width of paper 2. Further, all the column-control electrode strips 8C are arranged so that the gates are positioned keeping the pitch 'a' across the width of recording paper 2.

This pitch 'a' determines the resolution of the image formed on recording paper 2, with respect to the width thereof. For example, in order to obtain a resolution of 600 dpi (dot per inch), 600 gates are arranged for one inch width; in this case, pitch 'a' will be 1/600 inch. Since the gates are formed at the intersections between row-control electrode strips 8R and column-control electrode strips 8C, the total number of the gates in a 8 row×640 column configuration is 5,120.

Column-control electrode strips 8C and row-control electrode strips 8R are selectively applied with a voltage, either 0V or 300 V, for example, from a column-control electrode driver circuit 17 and a row-control electrode driver circuit 16 shown in FIG. 2, respectively. Column-control electrode driver circuit 17 and row-control electrode driver circuit 16 are controlled by an unillustrated controller so as to output either 0 V or 300 V to column-control electrode strips 8C and row-control electrode strips 8R, in accordance with the image signal. In the case of this embodiment, only the gates located at interactions between column-control electrode strips 8C and row-control electrode strips 8R, both having a voltage of 300 V applied thereto will allow passage of the toner.

Next, the method of operation in control electrode unit 8 will be described by exemplifying a case where row-control electrode strips 8R are operated or scanned in the same order (voltage is applied to the electrode strips in the same order) as the arranged order of row-control electrode strips 8R with respect to the conveyed direction of paper 2.

Figure 4:
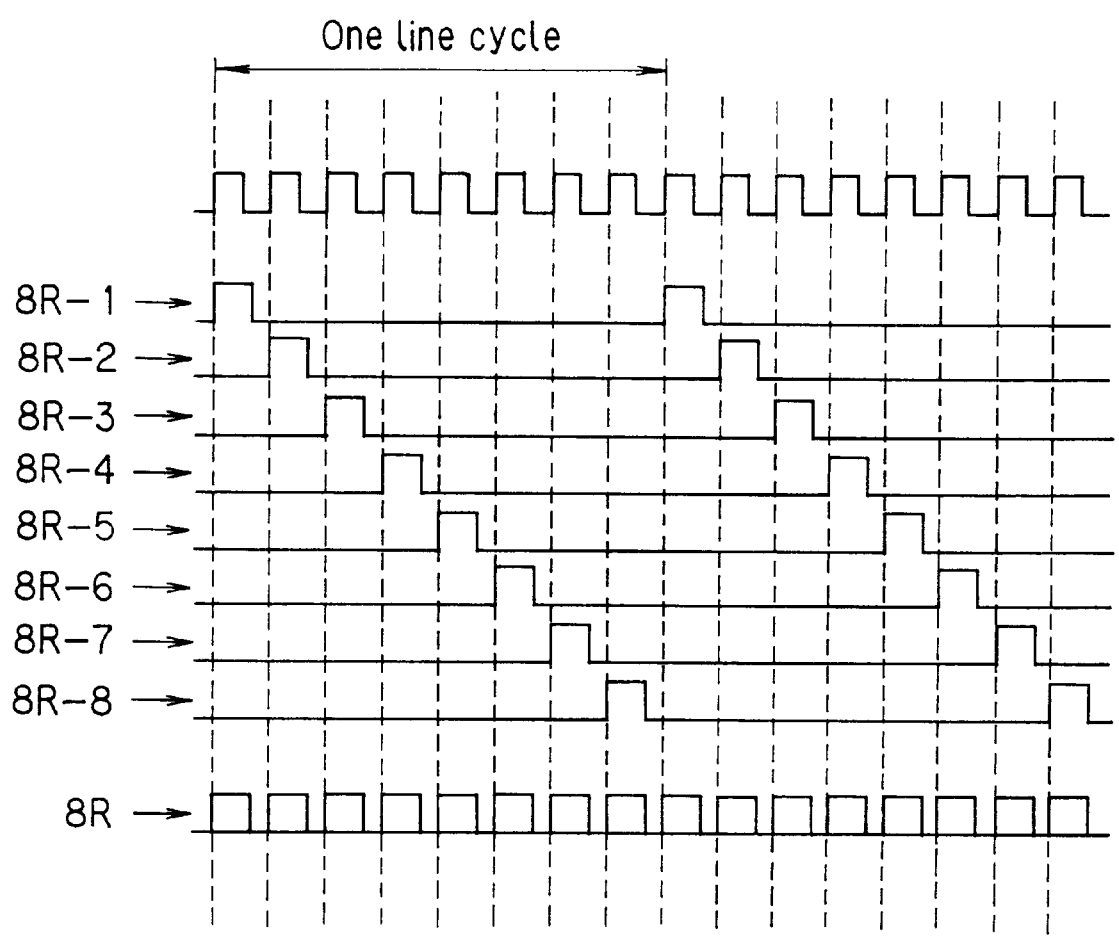
FIG. 4 is a timing chart for explaining the driver controlling method of the control electrode unit constituting an image forming apparatus in accordance with the embodiment of the invention.

As shown in FIG. 4, row-control electrode strips 8R are operated based on a clock CLK signal producing regularly occurring pulses, in a time-divisional manner, sequentially starting from row-control electrode strip 8R-1 to row-control electrode strip 8R-8. It should be noted that two or more of row-control electrode strips 8R are never operated at the same time. On the other hand, each of column-control electrode 8C is operated by a signal having a suitable pattern that changes with time in accordance with the position of the row-control electrode strip 8R being operated, thus forming the image.

Figure 3:
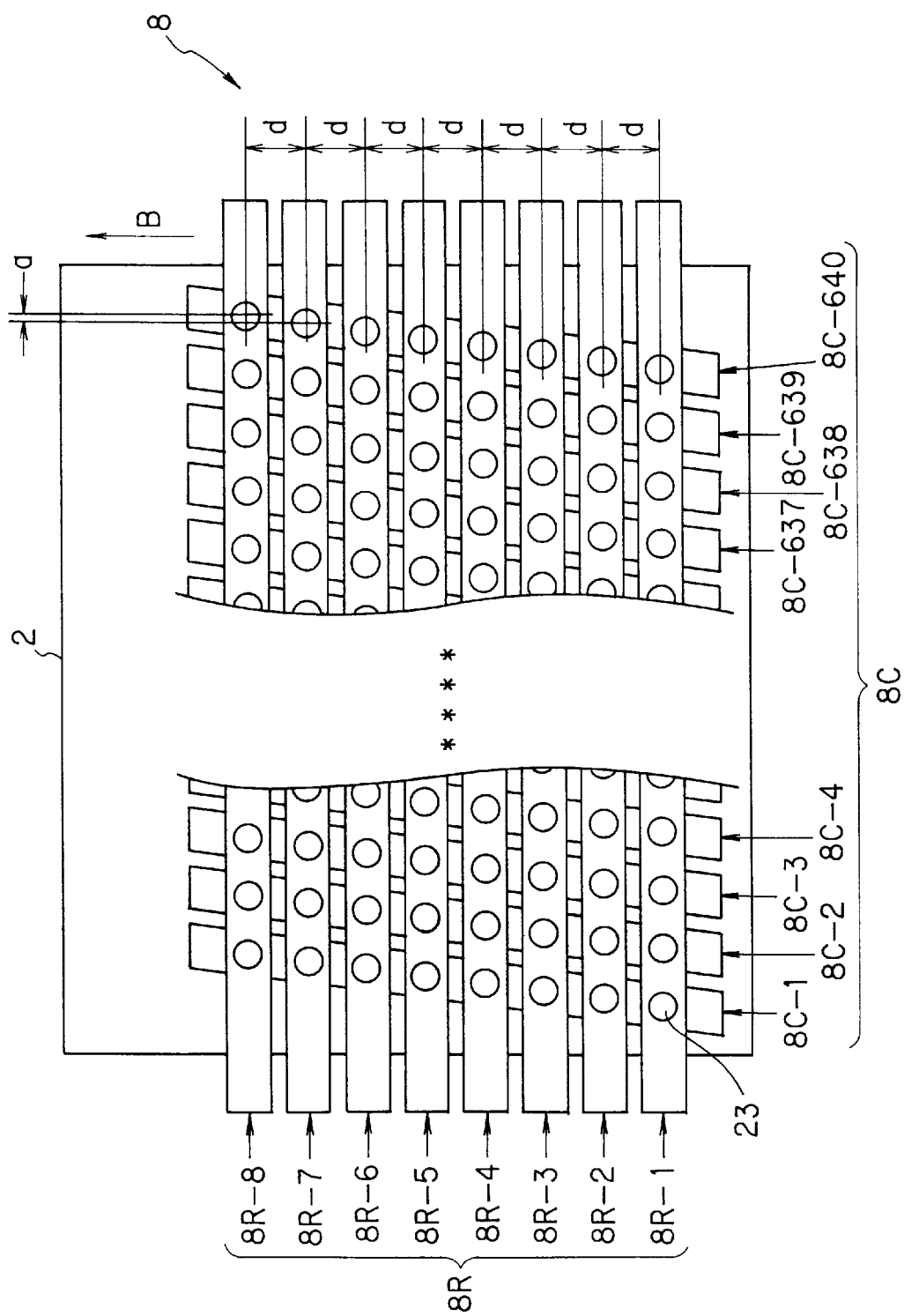
FIG. 3 is a diagram for explaining the configuration of the control electrode unit constituting an image forming apparatus in accordance with the embodiment of the invention.

In order to exactly obtain a predetermined resolution with respect to the conveyed direction B of paper 2, the array pitch 'd' between neighboring row-control electrode strips 8R shown in FIG. 3, needs to be set in relation with the timing of operation. More specifically, when the resolution in the conveyed direction B of recording paper 2 is 600 dpi, the array pitch 'd' is set so that paper 2 will travel by only 1/600 inch during the time span of one line, i.e., one cycle of operation from row-control electrode strip 8R-1 to row-control electrode strip 8R-8.

The method of determining the array pitch 'd' between row-control electrode strips to achieve a predetermined resolution will be illustrated further. In this embodiment, the number 'm' of row-control electrode strips 8R is 8, and therefore, the conveyed distance 'z' of recording paper 2 while a single row-control electrode strip 8R is operated, will be 1/4800 inch (the reciprocal of the product of the resolution 'x' and the number of row-control electrode strips 'm'). In this case, since row-control electrode strips 8R are adapted to be operated or scanned in the same order as the arranged order of row-control electrode strips 8R with respect to the conveyed direction B of recording paper 2, the distance between the toner image dots formed by the respective control electrode strips is shorter by the above conveyed distance 'z' of the paper than the distance 'y' (=n/x) which is defined to be the distance between the toner image dots formed when recording paper 2 is not moved.

Accordingly, in order to obtain a particular resolution 'x' with respect to the conveyed direction of paper 2, the array pitch 'd' between row-control electrode strips 8R with respect to conveyed direction B of recording medium 2 should be set as the distance 'y' plus the conveyed distance 'z', by taking into consideration the reduction of the conveyed distance 'z' in the pitch of the toner image by the conveyance of paper 2. In this case, $d=(n+1/m)/x=n/600+1/4800$ (inch), where n is a natural number.

By setting the array pitch 'd' of row-control electrode strips 8R as above, the resolution of the image formed on paper 2 when row-control electrode strips 8R are operated continuously with a fixed cycle as shown in FIG. 4, can exactly be set to 600 dpi with respect to the conveyed direction B. In other words, when row-control electrode strips 8R are arranged having an array pitch 'd' as stated above, it is possible to continuously effect time-divisional operation of row-control electrode strips 8R, whereby it is possible to eliminate the necessity for providing inactive time during image forming.

In the above description of this embodiment, an example was shown in which row-control electrode strips 8R are operated or scanned in the same order as the arranged order of row-control electrode strips 8R with respect to the conveyed direction B of paper 2. On the other hand, if row-control electrode strips 8R are operated or scanned in the reverse order, the pitch of the toner image dots formed by row-control electrode strips 8R will become greater by the above conveyed distance 'z' than the distance 'y' ($=n/x$) between the toner image dots formed when paper 2 is not moved.

Accordingly, in order to obtain a particular resolution 'x' with respect to the conveyed direction B of paper 2, the array pitch 'd' between row-control electrode strips 8R with respect to conveyed direction B of recording medium 2 should be set as the distance 'y' minus the conveyed distance 'z', by taking into consideration the increase of the conveyed distance 'z' in the pitch of the toner image by the conveyance of paper 2. In this case, $d=(n-1/m)/x=n/600-1/4800$ (inch).

As has been detailed heretofore, in the apparatus of this embodiment, the array pitch 'd' of row-control electrode strips 8R with respect to the conveyed direction B of recording medium 2 is determined based on the order of applying the operating voltage to row-control electrode strips 8R, resolution 'x' in the toner image with respect to the conveyed direction of paper 2, and the number 'm' of the row-control electrode strips. Therefore, it is possible to operate the row-control electrode strips 8R based on a clock CLK signal having a fixed cycle, to thereby provide an image having a predetermined resolution 'x'.

As has been apparent from the description, in accordance with the invention, the array pitch in the control electrode (row-control electrode strips 8R) with respect to the conveyed direction of the recording medium is adapted to be determined based on the order of applying of the operating voltage, the resolution in the image with respect to the conveyed direction of the recording medium, and the number of control electrode strips (row-control electrode strips 8R). As a result, it becomes unnecessary to provide invalid time during image forming, thus making it possible to efficiently reduce the time required for image forming.

Further, as a result of not providing the invalid time during image forming, it becomes possible to operate the control electrode strips (row-control electrode strips 8R) at a fixed cycle of operation. Therefore, it is possible to simplify the control operation of each of the electrodes and the circuit configuration of the drivers, and hence reduce the cost of the apparatus.

What is claimed is:

1. An image forming apparatus wherein an image is formed on a recording medium with the developer by performing voltage application in a time-divisional manner, to a plurality of control electrode strips having passage holes that allow the charged developer particles to pass therethrough, characterized in that when voltage application is performed in the same direction as the arranged order of the control electrode strips with respect to the conveyed direction of the recording medium, the array pitch 'd' of the control electrode strips with respect to the conveyed direction of the recording medium is set so as to satisfy the following relation:

$$d=(n+1/m)/x$$

(where n is a natural number)

where x is the resolution of the image and m is the number of the control electrode strips.

2. An image forming apparatus wherein an image is formed on a recording medium with the developer by performing voltage application in a time-divisional manner, to a plurality of control electrode strips having passage holes that allow the charged developer particles to pass therethrough, characterized in that when voltage application is performed in the reverse direction to the arranged order of the control electrode strips with respect to the conveyed direction of the recording medium, the array pitch 'd' of the control electrode strips with respect to the conveyed direction of the recording medium is set so as to satisfy the following relation:

$$d=(n-1/m)/x$$

(where n is a natural number)

where x is the resolution of the image and m is the number of the control electrode strips.

\* \* \* \* \*